US012772270B2

(12) United States Patent
Han et al.

(10) Patent No.: US 12,772,270 B2
(45) Date of Patent: Oct. 20, 2026

(54) METHODS AND APPARATUSES OF SELECTING A CARRIER FOR A SIDELINK MULTI-CARRIER OPERATION

(71) Applicant: Lenovo (Beijing) Limited, Beijing (CN)

(72) Inventors: Jing Han, Beijing (CN); Mingzeng Dai, Shanghai (CN); Congchi Zhang, Shanghai (CN); Haiming Wang, Beijing (CN); Lianhai Wu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 283 days.

(21) Appl. No.: 18/688,234

(22) PCT Filed: Sep. 6, 2021

(86) PCT No.: PCT/CN2021/116662
§ 371 (c)(1),
(2) Date: Feb. 29, 2024

(87) PCT Pub. No.: WO2023/029033
PCT Pub. Date: Mar. 9, 2023

(65) Prior Publication Data
US 2024/0406981 A1 Dec. 5, 2024

(51) Int. Cl.
*H04W 72/40* (2023.01)
*H04W 72/12* (2023.01)
*H04W 92/18* (2009.01)

(52) U.S. Cl.
CPC ........... *H04W 72/40* (2023.01); *H04W 72/12* (2013.01); *H04W 92/18* (2013.01)

(58) Field of Classification Search
CPC ..... H04W 72/12; H04W 72/40; H04W 92/18; H04W 36/033; H04W 72/542
See application file for complete search history.

(56) References Cited

U.S. PATENT DOCUMENTS

2018/0192459 A1 7/2018 Xu et al.
2019/0289627 A1 9/2019 Blasco Serrano et al.
(Continued)

FOREIGN PATENT DOCUMENTS

CN 110291731 A 9/2019
CN 110958700 A 4/2020
(Continued)

OTHER PUBLICATIONS

"Extended European Search Report", EP Application No. 21955564.6, Apr. 15, 2025, 12 pages.
(Continued)

*Primary Examiner* — Sulaiman Nooristany
(74) *Attorney, Agent, or Firm* — FIG. 1 Patents

(57) ABSTRACT

Embodiments of the present disclosure relate to methods and apparatuses of selecting a carrier for a sidelink multi-carrier operation in 3GPP (3rd Generation Partnership Project) 5G networks. According to an embodiment of the present disclosure, a UE includes a processor and a wireless transceiver coupled to the processor; and the processor of the UE is configured: to transmit, via the wireless transceiver to a network node, at least one of carrier quality information and carrier problem information of a sidelink (SL) between the UE and a further UE, in response to data to be transmitted on the SL or data already transmitted on one or more carriers of the SL and in response to the network node scheduling a carrier for a data transmission on the SL; or to determine whether the at least one of the carrier quality information and the carrier problem information of the SL fulfills a carrier selection or reselection condition, in response to the processor of the UE scheduling the carrier for the data transmission on the SL; and to select a carrier from multiple carriers configured on the SL, in response to the at least one of the carrier quality information and the carrier problem
(Continued)

information of the SL fulfilling the carrier selection or reselection condition.

20 Claims, 2 Drawing Sheets

(56) References Cited

U.S. PATENT DOCUMENTS

| | | | | |
|---|---|---|---|---|
| 2019/0319723 | A1 | 10/2019 | Axmon et al. | |
| 2020/0229194 | A1* | 7/2020 | Belleschi | H04L 5/0064 |
| 2021/0368372 | A1* | 11/2021 | Chen | H04W 4/70 |

FOREIGN PATENT DOCUMENTS

| | | | |
|---|---|---|---|
| CN | 111149405 | A | 5/2020 |
| CN | 111800219 | A | 10/2020 |
| CN | 112771920 | A | 5/2021 |
| EP | 3860260 | A1 | 8/2021 |
| WO | 2018031180 | A1 | 2/2018 |
| WO | 2020153721 | A1 | 7/2020 |

OTHER PUBLICATIONS

PCT/CN2021/116662 , "International Preliminary Report on Patentability", International Application No. PCT/CN2021/116662, Mar. 5, 2024, 4 pages.

PCT/CN2021/116662 , "International Search Report and Written Opinion", International Application No. PCT/CN2021/116662, Apr. 26, 2022, 7 pages.

* cited by examiner

METHODS AND APPARATUSES OF SELECTING A CARRIER FOR A SIDELINK MULTI-CARRIER OPERATION

TECHNICAL FIELD

Embodiments of the present application are related to wireless communication technology, and more particularly, related to methods and apparatuses of selecting a carrier for a sidelink multi-carrier operation in 3GPP (3rd Generation Partnership Project) 5G networks.

BACKGROUND

A sidelink is a long-term evolution (LTE) feature introduced in 3GPP Release 12, and enables a direct communication between proximal UEs, and data does not need to go through a base station (BS) or a core network. A sidelink communication system has been introduced into 3GPP 5G wireless communication technology, in which a direct link between two user equipments (UEs) is called a sidelink (SL).

3GPP 5G networks are expected to increase network throughput, coverage, and robustness and reduce latency and power consumption. With the development of 3GPP 5G networks, various aspects need to be studied and developed to perfect the 5G technology. Currently, details regarding how to select a carrier for a sidelink multi-carrier operation have not been discussed in 3GPP 5G technology yet.

SUMMARY

Some embodiments of the present application also provide a UE. The UE includes a processor and a wireless transceiver coupled to the processor; and the processor is configured: to transmit, via the wireless transceiver to a network node, at least one of carrier quality information and carrier problem information of a sidelink (SL) between the UE and a further UE, in response to data to be transmitted on the SL or data already transmitted on one or more carriers of the SL and in response to the network node scheduling a carrier for a data transmission on the SL; or to determine whether the at least one of the carrier quality information and the carrier problem information of the SL fulfills a carrier selection or reselection condition, in response to the processor of the UE scheduling the carrier for the data transmission on the SL; and to select a carrier from multiple carriers configured on the SL, in response to the at least one of the carrier quality information and the carrier problem information of the SL fulfilling the carrier selection or reselection condition.

Some embodiments of the present application provide a method, which may be performed by a user equipment (UE). The method includes: transmitting, to a network node, at least one of carrier quality information and carrier problem information of a sidelink (SL) between the UE and a further UE, in response to data to be transmitted on the SL or data already transmitted on one or more carriers of the SL and in response to the network node scheduling a carrier for a data transmission on the SL; or in response to the processor of the UE scheduling the carrier for the data transmission on the SL: determining whether the at least one of the carrier quality information and the carrier problem information of the SL fulfills a carrier selection or reselection condition; and selecting a carrier from multiple carriers configured on the SL, in response to the at least one of the carrier quality information and the carrier problem information of the SL fulfilling the carrier selection or reselection condition.

Some embodiments of the present application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a UE.

Some embodiments of the present application also provide a network node (e.g., a BS). The network node includes a processor and a wireless transceiver coupled to the processor; and the processor is configured: to receive, via the wireless transceiver from a UE, at least one of carrier quality information and carrier problem information of a SL between the UE and a further UE, in response to the network node scheduling a carrier for a data transmission on the SL; and to transmit, via the wireless transceiver to the UE, indicating information regarding a carrier selected by the network node for the data transmission on the SL.

Some embodiments of the present application provide a method, which may be performed by a network node (e.g., a BS). The method includes: receiving, from a UE, at least one of carrier quality information and carrier problem information of a SL between the UE and a further UE, in response to the network node scheduling a carrier for a data transmission on the SL; and transmitting, to the UE, indicating information regarding a carrier selected by the network node for the data transmission on the SL.

Some embodiments of the present application provide an apparatus. The apparatus includes: a non-transitory computer-readable medium having stored thereon computer-executable instructions, a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a network node (e.g., a BS).

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the present application can be obtained, a description of the present application is rendered by reference to specific embodiments thereof which are illustrated in the appended drawings. These drawings depict only exemplary embodiments of the present application and are not therefore intended to limit the scope of the present application.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP LTE and LTE advanced, 3GPP 5G NR, B5G, 6G, and so on. It is contemplated that along with developments of network architectures and new service scenarios, all embodiments in the present application are also applicable to similar technical problems; and moreover, the terminologies recited in the present application may change, which should not affect the principle of the present application.

Figure 1:
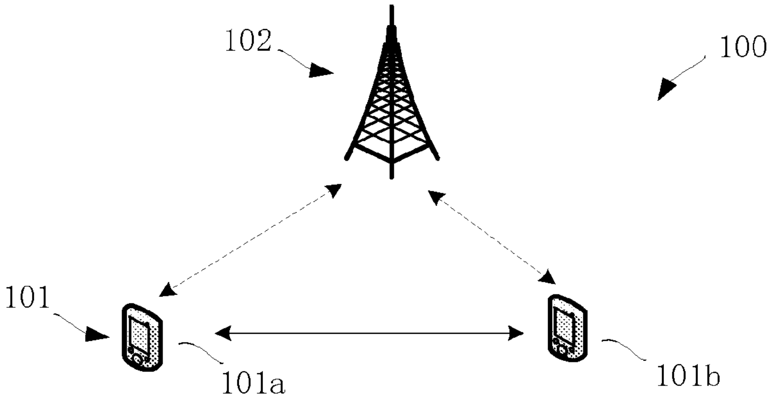
FIG. 1 illustrates an exemplary sidelink wireless communication system in accordance with some embodiments of the present application.

FIG. 1 illustrates an exemplary sidelink wireless communication system in accordance with some embodiments of the present application.

As shown in FIG. 1, a wireless communication system 100 includes at least one user equipment (UE) 101 and at least one base station (BS) 102. In particular, the wireless communication system 100 includes two UEs 101 (e.g., UE 101*a* and UE 101*b*) and one BS 102 for illustrative purpose. Although a specific number of UEs 101 and BS 102 are depicted in FIG. 1, it is contemplated that any number of UEs 101 and BSs 102 may be included in the wireless communication system 100.

UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present application, UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network.

In some embodiments of the present application, a UE is a pedestrian UE (P-UE or PUE) or a cyclist UE. In some embodiments of the present application, UE(s) 101 includes wearable devices, such as smart watches, fitness bands, optical head-mounted displays, or the like. Moreover, UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. UE(s) 101 may communicate directly with BSs 102 via LTE or NR Uu interface.

In some embodiments of the present application, each of UE(s) 101 may be deployed an IoT application, an eMBB application and/or a URLLC application. For instance, UE 101*a* may implement an IoT application and may be named as an IoT UE, while UE 101*b* may implement an eMBB application and/or a URLLC application and may be named as an eMBB UE, an URLLC UE, or an eMBB/URLLC UE. It is contemplated that the specific type of application(s) deployed in UE(s) 101 may be varied and not limited.

In a sidelink communication system, a transmission UE may also be named as a transmitting UE, a Tx UE, a sidelink Tx UE, a sidelink transmission UE, or the like. A reception UE may also be named as a receiving UE, a Rx UE, a sidelink Rx UE, a sidelink reception UE, or the like.

According to some embodiments of FIG. 1, UE 101*a* functions as a Tx UE, and UE 101*b* functions as a Rx UE. UE 101*a* may exchange sidelink messages with UE 101*b* through a sidelink, for example, PC5 interface as defined in 3GPP TS 23.303. UE 101*a* may transmit information or data to other UE(s) within the sidelink communication system, through sidelink unicast, sidelink groupcast, or sidelink broadcast. For instance, UE 101*a* transmits data to UE 101*b* in a sidelink unicast session. UE 101*a* may transmit data to UE 101*b* and other UEs in a groupcast group (not shown in FIG. 1) by a sidelink groupcast transmission session. Also, UE 101*a* may transmit data to UE 101*b* and other UEs (not shown in FIG. 1) by a sidelink broadcast transmission session.

Alternatively, according to some other embodiments of FIG. 1, UE 101*b* functions as a Tx UE and transmits sidelink messages, UE 101*a* functions as a Rx UE and receives the sidelink messages from UE 101*b*.

Both UE 101*a* and UE 101*b* in the embodiments of FIG. 1 may transmit information to BS(s) 102 and receive control information from BS(s) 102, for example, via LTE or NR Uu interface. BS(s) 102 may be distributed over a geographic region. In certain embodiments of the present application, each of BS(s) 102 may also be referred to as an access point, an access terminal, a base, a base unit, a macro cell, a Node-B, an evolved Node B (eNB), a gNB, a Home Node-B, a relay node, or a device, or described using other terminology used in the art. BS(s) 102 is generally a part of a radio access network that may include one or more controllers communicably coupled to one or more corresponding BS(s) 102.

The wireless communication system 100 may be compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3GPP-based network, a 3GPP 5G network, a satellite communications network, a high altitude platform network, and/or other communications networks.

In some embodiments of the present application, the wireless communication system 100 is compatible with the 5G NR of the 3GPP protocol, wherein BS(s) 102 transmit data using an OFDM modulation scheme on the downlink (DL) and UE(s) 101 transmit data on the uplink (UL) using a Discrete Fourier Transform-Spread-Orthogonal Frequency Division Multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present application, BS(s) 102 may communicate using other communication protocols, such as the IEEE 802.11 family of wireless communication protocols. Further, in some embodiments of the present application, BS(s) 102 may communicate over licensed spectrums, whereas in other embodiments, BS(s) 102 may communicate over unlicensed spectrums. The present application is not intended to be limited to the implementation of any particular wireless communication system architecture or protocol. In yet some embodiments of present application, BS(s) 102 may communicate with UE(s) 101 using the 3GPP 5G protocols.

In general, in 3GPP Rel-15, a multi-carrier operation was introduced for a LTE vehicle to everything (V2X) system, in which multiple carriers can be supported on a SL and a UE can select one or multiple carriers for data transmission. In that time, a UE can select carrier(s) available or transmission based on a channel busy ratio (CBR) measurement report on each carrier, and the UE can also keep the selected carrier(s) when CBR measurement result(s) is less than a configured threshold to avoid too frequent carrier switching.

In 3GPP Rel-16, a SL is firstly introduced for a NR system, but only one carrier is supported for simplicity purpose. In 3GPP Rel-17, to adapt a NR SL for power sensitive UEs, e.g., P-UEs, public safety UEs, or commercial sidelink UEs, some power saving mechanisms were studied and introduced on a SL, for example, partial sensing and SL discontinuous reception (DRX) mechanisms are being specified.

For further SL development in 3GPP Rel-18, it was proposed that a multi-carrier operation needs to be introduced for a NR SL, to fulfill much more SL services that need high throughput and reliability. A carrier (re)selection scheme is one of key schemes for a multi-carrier operation. Currently, in a NR SL, several new features were introduced compared with LTE, e.g., a SL measurement report, a re-evaluation operation, a pre-emption operation, a sidelink radio link failure (SL-RLF), a hybrid automatic repeat request (HARQ) feedback based retransmission, and etc. Several new features may impact a carrier (re)selection procedure which has not been discussed.

Given the above, several issues need to be solved: whether a SL measurement report impacts a carrier (re) selection procedure and how to impact the carrier (re) selection procedure (e.g., for unicast); whether multi-carriers with different numerologies impact a carrier (re)selection procedure; whether a re-evaluation operation and/or a pre-emption operation impacts a carrier (re)selection procedure; whether an UL or SL prioritization procedure impacts a carrier (re)selection procedure; whether unicast link maintenance (e.g., a SL-RLF) impacts a carrier (re)selection procedure; and whether a HARQ feedback based retransmission impacts a carrier (re)selection procedure.

Embodiments of the present application propose a carrier (re)selection procedure for a NR SL. Some embodiments of the present application introduce new carrier (re)selection criterion which includes SL measurement result(s), SL pathloss related information, SL numerologies, the SL grant unavailable total number (which may be caused by a re-evaluation operation, a pre-emption operation, and/or a SL de-prioritization operation), a SL-RLF declaration, a RLC retransmission total number, and/or a HARQ DTX or NACK total number. Some embodiments of the present application propose a prohibit timer for a problematic carrier, to prevent (re)selecting the problematic carrier during a carrier (re)selection procedure. More details will be illustrated in following text in combination with the appended drawings.

Figure 2:
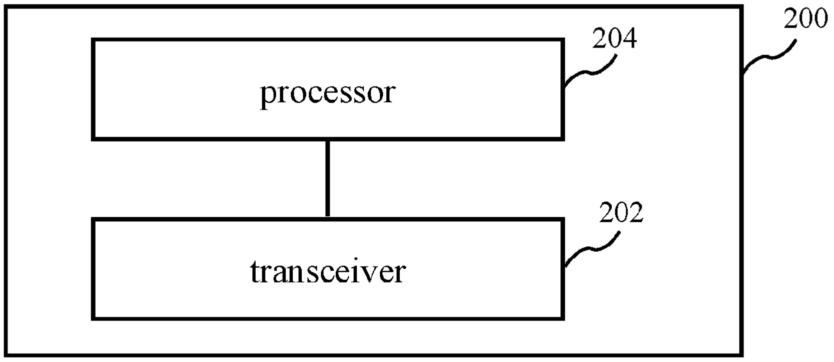
FIG. 2 illustrates an exemplary block diagram of an apparatus according to some embodiments of the present application.

FIG. 2 illustrates an exemplary block diagram of an apparatus according to some embodiments of the present application. As shown in FIG. 2, the apparatus 200 may include at least one processor 204 and at least one transceiver 202 coupled to the processor 204. The apparatus 200 may be a UE or a network node (e.g., a BS).

Although in this figure, elements such as the at least one transceiver 202 and the processor 204 are described in the singular, the plural is contemplated unless a limitation to the singular is explicitly stated. In some embodiments of the present application, the transceiver 202 may be divided into two devices, such as a receiving circuitry and a transmitting circuitry. In some embodiments of the present application, the apparatus 200 may further include an input device, a memory, and/or other components.

In some embodiments of the present application, the apparatus 200 may be a UE (e.g., UE 101*a* or UE 101*b* illustrated and shown in FIG. 1). For instance, the UE is a Tx UE (e.g., UE 101*a* illustrated and shown in FIG. 1). The UE may be configured with sidelink resource allocation mode 1 (i.e., Mode 1) or sidelink resource allocation mode 2 (i.e., Mode 2).

The transceiver 202 of the UE may be configured to transmit, to a network node (e.g., BS 102 illustrated and shown in FIG. 1), carrier quality information and/or carrier problem information of a SL between the UE and a further UE (which may be a Rx UE, e.g., UE 101*b* illustrated and shown in FIG. 1), if data is to be transmitted on the SL or data has already transmitted on carrier(s) of the SL and if the network node schedules a carrier for a data transmission on the SL (i.e., Mode 1). Or, the processor 204 of the UE may be configured: to determine whether the carrier quality information and/or the carrier problem information of the SL fulfills a carrier (re)selection condition, if the processor 204 of the UE schedules the carrier for the data transmission on the SL (i.e., Mode 2); and to select a carrier from multiple carriers configured on the SL, if the carrier quality information and/or the carrier problem information of the SL fulfills the carrier (re)selection condition.

In following text, the UE (e.g., UE 101*a* illustrated and shown in FIG. 1) is named as "the 1st UE", and the further UE (e.g., UE 101*b* illustrated and shown in FIG. 1) is named as "the 2nd UE".

According to some embodiments, if the network node schedules the carrier for the data transmission on the SL (i.e., Mode 1), the processor 204 of the 1st UE is configured to receive, via the transceiver 202 from the network node, indicating information regarding a carrier selected by the network node for the data transmission on the SL.

According to some embodiments, if the network node schedules the carrier for the data transmission on the SL (i.e., Mode 1), the processor 204 of the 1st UE is configured: to determine the carrier quality information of the SL; and/or to determine the carrier problem information regarding whether a problem has occurred on a carrier within multiple carriers configured on the SL.

In some embodiments, "a SL measurement report received by the 1st UE from the 2nd UE" and/or "SL pathloss related information maintained by the 1st UE" can be reported to the network node if the 1st UE is in Mode 1. In particular, if the 1st UE is in Mode 1, in which the 1st UE is in a radio resource control (RRC) connected mode and a SL resource is scheduled by a BS, the 1st UE can report the received SL measurement results of each carrier to the BS, or report maintained pathloss related information of each carrier to a BS. The BS will use these information received from the 1st UE for SL resource scheduling.

In some embodiments, the carrier quality information of the SL is obtained by the 1st UE from "configuration received from the network node" or "pre-configuration stored in the 1st UE". In some further embodiments, the carrier quality information of the SL is received via the transceiver 202 of the 1st UE from the 2nd UE. In some other embodiments, the carrier quality information of the SL is maintained by the processor 204 of the 1st UE according to information received from the 2nd UE.

In some embodiments, the carrier quality information of the SL may be related to at least one of:

(1) measurement result(s) which includes SL reference signal received power (SL-RSRP) of the carrier within multiple carriers configured on the SL;
(2) sub-carrier spacing (SCS) parameter(s) for the carrier within multiple carriers configured on the SL; and
(3) pathloss related information maintained by the processor of the 1st UE for the carrier within multiple carriers configured on the SL.

Some embodiments of FIG. 2 assume that the processor of the 1st UE schedules the carrier for the data transmission on the SL (i.e., Mode 2). That is, the 1st UE is in Mode 2.

According to some embodiments, the carrier (re)selection condition may include at least one of.

(1) The transceiver 202 of the 1st UE has received a measurement report one or more times from the 2nd UE. The measurement report indicates that a measurement result for the carrier is better than a measurement threshold.
(2) The transceiver 202 of the 1st UE does not receive ever a further measurement report from the 2nd UE. The further measurement report indicates that the measurement result for the carrier is worse than a further measurement threshold.
(3) A total number of the transceiver 202 of the 1st UE receiving the further measurement report is less than a number threshold.
(4) SL reference signal received power (RSRP) measured on the carrier is greater than a RSRP threshold.
(5) The SL RSRP measured on the carrier is greater than the RSRP threshold for a time period.
(6) The SL RSRP measured on the carrier is greater than the RSRP threshold, and a channel busy ratio (CBR) measured on the carrier is less than a CBR threshold.
(7) SL pathloss related information maintained for the carrier is less than a pathloss threshold.
(8) SL pathloss related information maintained for the carrier is less than the pathloss threshold for another time period.
(9) SL pathloss related information maintained for the carrier is less than the pathloss threshold, and channel busy ratio (CBR) measured on the carrier is less than a CBR threshold.
(10) SCS parameter(s) for the carrier is included in a list of allowed SCS parameters. The list is configured for a logical channel (LCH) of the 1st UE.

In some embodiments, if carrier numerology is included in sl-AllowedSCS-List of LCH, carrier can be selected. In one embodiment, a 1st UE is configured with multiple carriers for SL transmission, and each LCH is configured with a list of allowed SCS parameter, e.g., sl-AllowedSCS-List. In some cases, there is not such configured list, which represents that all SCS parameter(s) is allowed for the LCH. When the 1st UE has data for SL transmission, the 1st UE needs to select available carrier(s) for transmission firstly. If there is a configured list of allowed SCS parameter(s) for a specific LCH, only those carrier(s) with SCS parameter(s) included in the configured list for the LCH can be considered as candidate carrier(s) and can be (re)selected.

For example, the measurement threshold, the further measurement threshold, the number threshold, the RSRP threshold, the CBR threshold, and/or the pathloss threshold are associated with a priority. The processor 204 of the 1st UE may be configured to determine at least one of these thresholds according to an associated priority of the data to be transmitted on the SL. At least one of these thresholds may be configured or pre-configured by the network node.

In an embodiment, the 1st UE has established the unicast connection with the 2nd UE, the 1st UE is configured with multiple carriers for SL transmission, and SL measurement is configured for the 2nd UE for each carrier. A SL measurement report may be transmitted by the 2nd UE according to a configured event (e.g., event S1 or event S2). The 1st UE may use the received SL measurement report to maintain the SL pathloss related information of each carrier between the 1st UE and the 2nd UE. When the 1st UE has data for transmission via the unicast connection, the 1st UE needs to select available carrier(s) for transmission firstly.

(1) In one sub-embodiment, if a SL measurement report for event S1 (better than a threshold) is received for a carrier, this carrier is considered as a candidate carrier and can be selected.
(2) In a further sub-embodiment, if no SL measurement report for event S2 (worse than a threshold) is received for a carrier, optionally, during a time period (e.g., time period T1), this carrier is considered as a candidate carrier and can be selected.
(3) In another sub-embodiment, if measured SL RSRP on specific carrier is larger than a threshold, optionally, during a time period (e.g., time period T2), this specific carrier is considered as a candidate carrier and can be selected.
(4) In yet another sub-embodiment, if maintained SL pathloss related information on specific carrier is less than a threshold, optionally, during a time period (e.g., time period T3), this specific carrier is considered as a candidate carrier and can be selected.
(5) In an additional sub-embodiment, if measured CBR on specific carrier is less than a threshold, this specific carrier is considered as a candidate carrier and can be selected.

All conditions in the above five sub-embodiments can be combined. The corresponding threshold in each sub-embodiment may be configured by the network node, e.g., via RRC signaling or system information block (SIB).

All conditions in the above five sub-embodiments are also applicable for a carrier keep case. That is to say, if the 1st UE already performs a data transmission on a specific carrier, if all above conditions are fulfilled, the 1st UE will not be allowed to trigger a carrier re-selection procedure, and the carrier is not allowed to be re-selected.

In particular, according to some embodiments, after the transceiver 202 of the 1st UE starts transmitting data on a carrier within multiple carriers configured on the SL, if further data is available to be transmitted on the SL, the processor 204 of the 1st UE may be configured:

(1) to determine whether at least one of carrier quality information and carrier problem information of this carrier fulfills the carrier (re)selection condition associated with a set of thresholds; and
(2) to not trigger a carrier re-selection procedure and to continue transmitting the further data on this carrier if this carrier fulfills the carrier (re)selection condition associated with the set of thresholds.

According to some other embodiments, if no data is transmitted on this carrier and further data is available to be transmitted on the SL, the processor 204 of the 1st UE is configured:

(1) to determine whether the carrier quality information and/or the carrier problem information of this carrier fulfills the carrier (re)selection condition associated with a further set of thresholds; and (2) to transmit the further data on this carrier if this carrier fulfills the carrier (re)selection condition associated with the further set of thresholds.

In some embodiments, the carrier problem information of the SL may be related to at least one of:

(1) A SL grant unavailable case occurs on the carrier which is caused by a re-evaluation operation on the SL. In an embodiment, when a re-evaluation operation indicates that SL grant(s) is not available anymore, a carrier (re)selection procedure is triggered. In a further embodiment, if during a time period (e.g., T4), a SL grant unavailable case has happened one or more times (e.g., N times) because of the re-evaluation operation, a carrier (re)selection procedure is triggered.

(2) A SL grant unavailable case occurs on the carrier which is caused by a pre-emption operation on the SL. In an embodiment, when a pre-emption operation indicates that SL grant(s) is not available anymore, a carrier (re)selection procedure is triggered. In a further embodiment, if during a time period (e.g., T5), a SL grant unavailable case has happened one or more times (e.g., N times) because of the pre-emption operation, a carrier (re)selection procedure is triggered.

(3) A SL grant unavailable case occurs on the carrier which is caused by an UL or SL prioritization procedure of the 1st UE. In an embodiment, de-prioritization can trigger a carrier (re)selection procedure. In a further embodiment, a case that de-prioritization happens one or more times (e.g., N times) during a time period (e.g., T6) can trigger a carrier (re)selection procedure.

(4) A radio link failure (RLF) on the carrier of the SL. In an embodiment, when a SL-RLF is declared, a carrier is re-selected and a PC5-RRC connection is not released by the 1st UE. The 1st UE also reports the status to the network node. In one embodiment, the 1st UE is configured with multiple carriers for SL transmission. When the 1st UE already performs data transmission on specific carrier(s), the 1st UE will monitor whether a SL-RLF occurs on the SL or PC5 RRC connection. If a SL-RLF is declared for the specific carrier(s), a carrier (re)selection procedure is triggered, and a PC5-RRC connection of the specific carrier(s) is not released by the 1st UE. The 1st UE will report the carrier selection that is caused by the SL-RLF on the specific carrier(s) to the network node.

(5) A radio link control (RLC) retransmission total number. In an embodiment, if during a time period (e.g., T7), a total number of RLC retransmission number reaches a threshold (e.g., threshold X), a carrier (re) selection procedure is triggered. For instance, in one embodiment, the 1st UE is configured with multiple carriers for SL transmission. When the 1st UE already performs data transmission on specific carrier(s), the 1st UE will monitor the RLC retransmission number. If during a time period (e.g., T8) which is (pre)configured by the network node, a total number of RLC retransmission number reaches a threshold (e.g., X) which is (pre)configured by the network node, a carrier (re) selection procedure is triggered.

(6) A consecutive hybrid automatic repeat request (HARQ) discontinuous transmission (DTX) or negative acknowledgement (NACK) total number. In an embodiment, if during a time period (e.g., T9), a total number of consecutive HARQ DTX or NACK number reached a threshold (e.g., threshold Y), a carrier (re) selection procedure is triggered. For instance, in one embodiment, the 1st UE is configured with multiple carriers for SL transmission. When the 1st UE already performs data transmission on specific carrier(s), the 1st UE will monitor the consecutive HARQ DTX or NACK number. If during a time period (e.g., T10) which is (pre)configured by the network node, a total number of consecutive HARQ DTX or NACK number reaches a threshold (e.g., Y) which is (pre)configured by the network node, a carrier (re)selection procedure is triggered.

In an embodiment, the 1st UE is configured with multiple carriers for SL transmission. When the 1st UE already performs data transmission on specific carrier(s), the 1st UE will record a total number of SL grant unavailable case(s) caused by a re-evaluation or pre-emption operation.

(1) In one sub-embodiment, as long as SL grant unavailable case(s) which is caused by a re-evaluation or pre-emption operation happens on any carrier, a carrier (re)selection procedure is triggered.

(2) In another sub-embodiment, if during a time period (e.g., T**1*l***) which is (pre)configured by the network node, when a total number of SL grant unavailable case(s) caused by a re-evaluation or pre-emption operation reaches a threshold (e.g., threshold Z) which is (pre)configured by the network node, a carrier (re) selection procedure is triggered.

In an embodiment, the 1st UE is configured with multiple carriers for a SL transmission. When the 1st UE already performs data transmission on specific carrier(s), the 1st UE will record a total number of SL grant de-prioritization(s) caused by an UL or SL prioritization procedure, i.e., the SL transmission may be de-prioritized when a SL transmission and an UL transmission happen at the same time while the 1st UE cannot perform simultaneously the SL and UL transmissions.

(1) In one sub-embodiment, as long as SL grant de-prioritization case(s) happens on any carrier, a carrier (re)selection procedure is triggered.

(2) In another sub-embodiment, if during a time period (e.g., T12) which is (pre)configured by the network node, when a total number of deprioritized SL transmission(s) reaches a threshold (e.g., threshold W) which is (pre)configured by the network node, a carrier (re)selection procedure is triggered.

In some embodiments, the carrier (re)selection condition includes at least one of:

(1) A total number of unavailable SL grant(s) caused by the re-evaluation operation reaches a threshold.

(2) A total number of unavailable SL grant(s) caused by the pre-emption operation reaches a further threshold.

(3) A total number of de-prioritized SL grant(s) caused by the UL or SL prioritization procedure reach another threshold.

(4) A RLF is declared for a carrier within multiple carriers configured on the SL. In an embodiment, the processor 204 of the 1st UE is configured to not release a PC5-RRC connection of the carrier, if the RLF is declared and other carrier(s) within multiple carriers configured on the SL are still available.

(5) A RLC retransmission total number on the carrier within the multiple carriers reaches an additional threshold.

(6) The RLC retransmission total number on the carrier reaches the abovementioned additional threshold during a time period (e.g., T13).

(7) A consecutive HARQ DTX or NACK total number on the carrier within the multiple carriers reaches yet another threshold.

(8) The consecutive HARQ DTX or NACK total number on the carrier reaches the abovementioned another threshold during a time period (e.g., T14).

According to some embodiments, the processor 204 of the 1st UE is configured: to start a timer, if a problem occurs on a carrier within multiple carriers configured on the SL; and not to select this carrier when the timer is running. In particular, this time is a prohibit timer to prevent reselect problematic carrier. For example, if the carrier has problem happened and the 1st UE reselect another carrier for SL data transmission, a timer may be (re)started for problematic carrier, to prevent the problematic carrier is reselected again. When the timer is running, the problematic carrier is not allowed to be selected, and when the time expires, the carrier can be selected again.

In some embodiments of the present application, the apparatus 200 may be a network node (e.g., a BS, which may be BS 102 illustrated and shown in FIG. 1). The transceiver 202 in the network node may be configured to receive, from a UE (which may be a Tx UE, e.g., UE 101*a* illustrated and shown in FIG. 1), carrier quality information and/or carrier problem information of a SL between the UE and a further UE (which may be a Rx UE, e.g., UE 101*b* illustrated and shown in FIG. 1), if the network node schedules a carrier for a data transmission on the SL. That is, in these embodiments, the UE is configured with Mode). The transceiver 202 in the network node may be further configured to transmit, to the UE, indicating information regarding a carrier selected by the network node for the data transmission on the SL.

In some embodiments of the present application, the apparatus 200 may further include at least one non-transitory computer-readable medium. In some embodiments of the present disclosure, the non-transitory computer-readable medium may have stored thereon computer-executable instructions to cause a processor to implement the method with respect to a UE or a network node (e.g., a BS) as described above. For example, the computer-executable instructions, when executed, cause the processor 204 interacting with the transceiver 202, so as to perform operations of the methods, e.g., as described in view of FIGS. 3 and 4.

Figure 3:
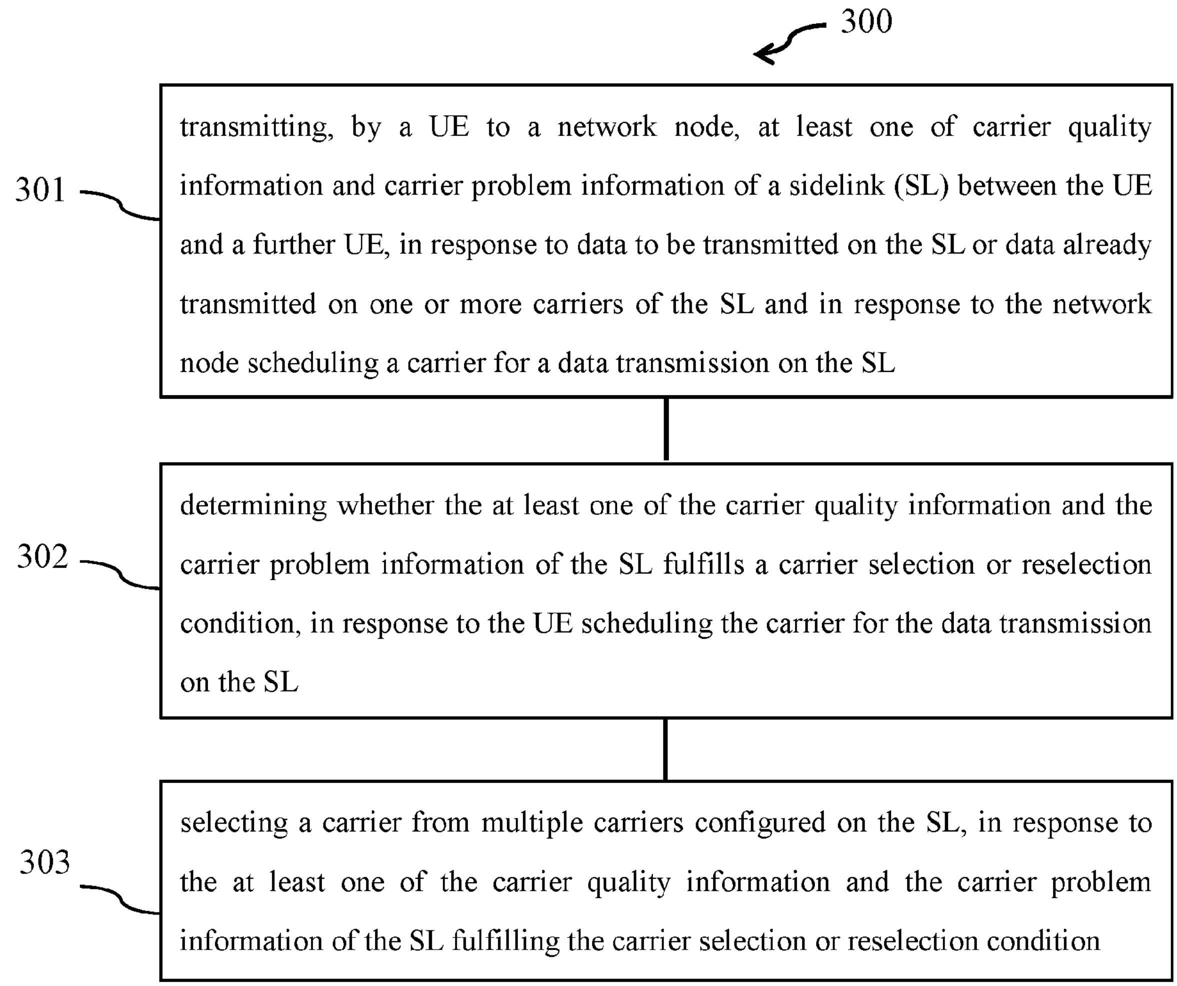
FIG. 3 illustrates a flow chart of a method for selecting a carrier from multiple carriers according to some embodiments of the present application.

FIG. 3 illustrates a flow chart of a method for selecting a carrier from multiple carriers according to some embodiments of the present application. The embodiments of FIG. 3 may be performed by a UE (e.g., UE 101*a* or UE 101*b* illustrated and shown in FIG. 1). Although described with respect to a UE, it should be understood that other devices may be configured to perform a method similar to that of FIG. 3.

In the exemplary method 300 as shown in FIG. 3, in operation 301, a UE (e.g., UE 101*a* illustrated and shown in FIG. 1) transmits, to a network node (e.g., a BS, which may be BS 102 illustrated and shown in FIG. 1), carrier quality information and/or carrier problem information of a SL between the UE and a further UE (e.g., UE 101*b* illustrated and shown in FIG. 1), in response to data to be transmitted on the SL or data already transmitted on one or more carriers of the SL and in response to the network node scheduling a carrier for a data transmission on the SL (i.e., Mode 1). In some embodiments, the UE is a Tx UE, and the further UE is a Rx UE.

In operation 302, the UE determines whether the carrier quality information and/or the carrier problem information of the SL fulfill a carrier (re)selection condition, in response to the UE scheduling the carrier for the data transmission on the SL (i.e., Mode 2).

In operation 303, the UE selects a carrier from multiple carriers configured on the SL, in response to the carrier quality information and/or the carrier problem information of the SL fulfilling the carrier (re)selection condition.

Figure 4:
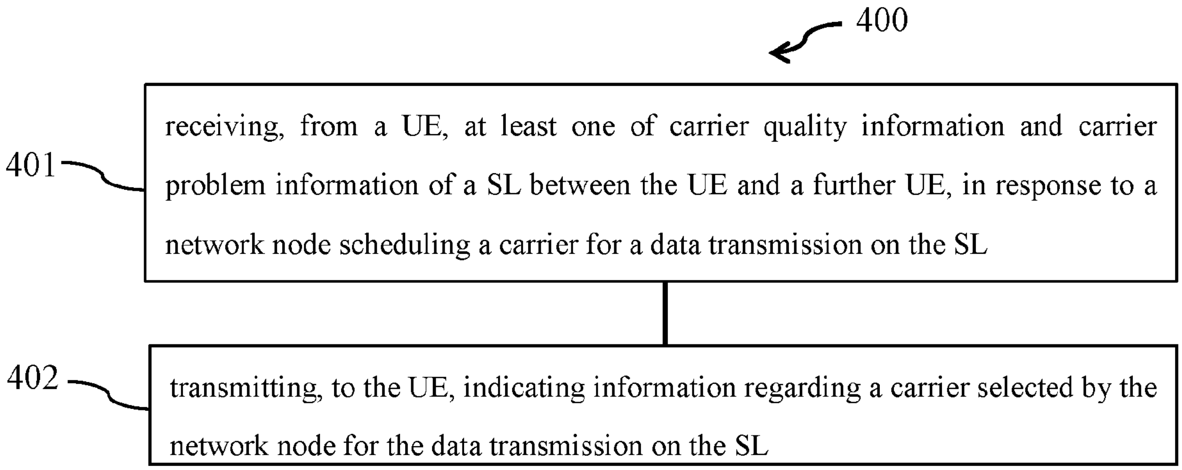
FIG. 4 illustrates a flow chart of a method for transmitting information regarding a selected carrier according to some embodiments of the present application.

It is contemplated that the method illustrated in FIG. 3 may include other operation(s) not shown, for example, any operation(s) described with respect to FIGS. 2 and 4.

Details described in all other embodiments of the present application (for example, details of selecting a carrier for a sidelink multi-carrier operation) are applicable for the embodiments of FIG. 3. Moreover, details described in the embodiments of FIG. 3 are applicable for all embodiments of FIGS. 1, 2 and 4.

FIG. 4 illustrates a flow chart of a method for transmitting information regarding a selected carrier according to some embodiments of the present application. The embodiments of FIG. 4 may be performed by a network node (e.g., a BS, which may be BS 102 illustrated and shown in FIG. 1). Although described with respect to a network node, it should be understood that other devices may be configured to perform a method similar to that of FIG. 4.

In the exemplary method 400 as shown in FIG. 4, in operation 401, a network node (e.g., BS 102 illustrated and shown in FIG. 1) receives, from a UE (e.g., UE 101*a* illustrated and shown in FIG. 1), carrier quality information and/or carrier problem information of a SL between the UE and a further UE (e.g., UE 101*b* illustrated and shown in FIG. 1), in response to the network node scheduling a carrier for a data transmission on the SL (i.e., Mode 1).

In operation 402, the network node transmits, to the UE, indicating information regarding a carrier selected by the network node for the data transmission on the SL. In some embodiments, the UE is a Tx UE, and the further UE is a Rx UE.

It is contemplated that the method illustrated in FIG. 4 may include other operation(s) not shown, for example, any operation(s) described with respect to FIGS. 2 and 3.

Details described in all other embodiments of the present application (for example, details of selecting a carrier for a sidelink multi-carrier operation) are applicable for the embodiments of FIG. 4. Moreover, details described in the embodiments of FIG. 4 are applicable for all embodiments of FIGS. 1-3.

The method(s) of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including.

What is claimed:

1. A first user equipment (UE) for wireless communication, comprising:

at least one memory; and at least one processor coupled with the at least one memory and operable to cause the first UE to:

transmit, in a first mode associated with a base station scheduling a carrier for a data transmission on a sidelink (SL) between the first UE and a second UE, signaling to the base station, wherein the signaling indicates at least one of carrier quality information or carrier problem information associated with multiple carriers configured on the SL, and wherein the signaling is transmitted based at least in part on data that is to be transmitted on the SL or that is already transmitted on the SL;

determine, in a second mode associated with the UE scheduling the carrier for the data transmission on the SL, whether at least one of the carrier quality information or the carrier problem information fulfills a carrier selection or reselection condition;

determine, in the first mode and in the second mode, the carrier from the multiple carriers based at least in part on the carrier quality information and the carrier problem information, wherein the carrier problem information indicates whether a carrier failure has occurred on at least one carrier of the multiple carriers; and transmit the data transmission on the SL based at least in part on the carrier.

2. The first UE of claim 1, wherein to determine the carrier, the at least one processor is operable to cause the first UE to receive, in the first mode and from the base station, additional signaling that indicates the carrier.

3. The first UE of claim 1, wherein the at least one processor is further operable to cause the first UE to at least one of:

determine the carrier quality information based at least in part on a sidelink measurement report from the second UE or pathloss related information maintained by the first UE; and determine the carrier problem information by monitoring for the carrier failure.

4. The first UE of claim 1, wherein the at least one processor is further operable to cause the first UE to at least one of:

receive, from the base station, additional signaling that configures the carrier quality information;

obtain the carrier quality information from a pre-configuration stored at the first UE;

receive, from the second UE, the carrier quality information; or receive, from the second UE, information, wherein the carrier quality information is maintained by the first UE based at least in part on the information.

5. The first UE of claim 1, wherein the carrier quality information is based at least in part on at least one of:

a measurement result that indicates an SL reference signal received power (SL-RSRP) of the carrier;

a sub-carrier spacing (SCS) parameter for the carrier; or pathloss information associated with the carrier.

6. The first UE of claim 1, wherein the carrier selection or reselection condition comprises at least one of:

the first UE receiving a first measurement report from the second UE, wherein the first measurement report indicates that a measurement result for the carrier is greater than a first measurement threshold;

the first UE failing to receive a second measurement report from the second UE, wherein the second measurement report indicates that the measurement result for the carrier is less than a second measurement threshold;

a total number of wireless transceivers of the first UE associated with receiving the second measurement report being less than a number threshold;

an SL reference signal received power (RSRP) measured on the carrier being greater than a RSRP threshold;

the SL RSRP measured on the carrier being greater than the RSRP threshold for a first time period;

a channel busy ratio (CBR) measured on the carrier being less than a CBR threshold;

SL pathloss information associated with the carrier being less than a pathloss threshold;

the SL pathloss information being less than the pathloss threshold for a second time period; or a sub-carrier spacing (SCS) parameter for the carrier being included in a list of allowed SCS parameters, wherein the list is configured for a logical channel (LCH) of the first UE.

7. The first UE of claim 6, wherein at least one of the first measurement threshold, the second measurement threshold, the number threshold, the RSRP threshold, the CBR threshold, or the pathloss threshold is associated with a priority, and wherein the at least one processor is further operable to cause the first UE to determine at least one of the first measurement threshold, the second measurement threshold, the number threshold, the RSRP threshold, the CBR threshold, or the pathloss threshold based at least in part on an associated priority of the data, wherein at least one of the first measurement threshold, the second measurement threshold, the number threshold, the RSRP threshold, the CBR threshold, or the pathloss threshold is configured or pre-configured by the base station.

8. The first UE of claim 1, wherein the carrier problem information is based at least in part on at least one of:

a first SL grant unavailable case occurring on the at least one carrier based at least in part on a re-evaluation operation on the SL;

a second SL grant unavailable case occurring on the at least one carrier based at least in part on a pre-emption operation on the SL;

a third SL grant unavailable case occurring on the at least one carrier based at least in part on at least one of an uplink (UL) prioritization procedure or an SL prioritization procedure;

a radio link failure (RLF) on the at least one carrier;

a radio link control (RLC) retransmission total number; or a consecutive hybrid automatic repeat request (HARQ) discontinuous transmission (DTX) or negative acknowledgement (NACK) total number.

9. The first UE of claim 8, wherein the carrier selection or reselection condition includes at least one of:

a first number of one or more unavailable SL grants caused by the re-evaluation operation being greater than or equal to a first threshold;

a second number of one or more unavailable SL grants caused by the pre-emption operation being greater than or equal to a second threshold;

a third number of one or more de-prioritized SL grants caused by the UL prioritization procedure or the SL prioritization procedure being greater than or equal to a third threshold;

the RLF being declared for the at least one carrier;

an RLC retransmission total number on the at least one carrier being greater than or equal to a fourth threshold;

the RLC retransmission total number on the at least one carrier being greater than or equal to the fourth threshold during a third time period;

a consecutive HARQ DTX or NACK total number on the carrier within the multiple carriers being greater than or equal to a fifth threshold; and the consecutive HARQ DTX or NACK total number on the carrier being greater than or equal to the fifth threshold during a fourth time period.

10. The first UE of claim 9, wherein the at least one processor is further operable to cause the first UE to refrain from releasing a PC5 radio resource control (RRC) connection of the carrier based at least in part on the RLF and one or more additional carriers of the multiple carriers being available.

11. The first UE of claim 1, wherein the at least one processor is further operable to cause the first UE to:

start a timer based at least in part on a problem occurring on an additional carrier of the multiple carriers; and refrain from selecting the additional carrier based at least in part on the timer running.

12. The first UE of claim 1, wherein the at least one processor is further operable to cause the first UE to:

determine, after starting the data transmission on the carrier, that additional data is available to be transmitted on the SL;

determine whether at least one of the carrier quality information or the carrier problem information fulfills the carrier selection or reselection condition associated with a set of thresholds;

refrain from triggering a carrier re-selection procedure based at least in part on the carrier fulfilling the carrier selection or reselection condition associated with the set of thresholds; and transmit, based at least in part on refraining from triggering the carrier re-selection procedure, the additional data on the carrier.

13. A base station for wireless communication, comprising:

at least one memory; and at least one processor coupled with the at least one memory and operable to cause the base station to:

receive, in a mode associated with the base station scheduling a carrier for a data transmission on a sidelink (SL) between a first user equipment (UE) and a second UE, first signaling from the first UE, wherein the first signaling indicates carrier quality information and carrier problem information associated with multiple carriers configured on the SL, and wherein the first signaling is received based at least in part on data that is to be transmitted on the SL or that is already transmitted on the SL;

select the carrier from the multiple carriers based at least in part on the carrier quality information and the carrier problem information, wherein the carrier problem information indicates whether a carrier failure has occurred on at least one carrier of the multiple carriers; and transmit, to the first UE, second signaling that indicates the carrier for the data transmission on the SL.

14. A method performed by a first user equipment (UE), the method comprising:

transmitting, in a first mode associated with a base station scheduling a carrier for a data transmission on a sidelink (SL) between the first UE and a second UE, signaling to the base station, wherein the signaling indicates at least one of carrier quality information or carrier problem information associated with multiple carriers configured on the SL, and wherein the signaling is transmitted based at least in part on data that is to be transmitted on the SL or that is already transmitted on the SL;

determining, in a second mode associated with the UE scheduling the carrier for the data transmission on the SL, whether the at least one of the carrier quality information or the carrier problem information fulfills a carrier selection or reselection condition;

determining, in the first mode and in the second mode, the carrier from the multiple carriers based at least in part on the carrier quality information and the carrier problem information, wherein the carrier problem information indicates whether a carrier failure has occurred on at least one carrier of the multiple carriers; and transmitting the data transmission on the SL based at least in part on the carrier.

15. A method performed by a base station, the method comprising:

receiving, in a mode associated with the base station scheduling a carrier for a data transmission on a sidelink (SL) between a first user equipment (UE) and a second UE, first signaling from the first UE, wherein the first signaling indicates carrier quality information and carrier problem information associated with multiple carriers configured on the SL, and wherein the first signaling is received based at least in part on data that is to be transmitted on the SL or that is already transmitted on the SL;

selecting the carrier from the multiple carriers based at least in part on the carrier quality information and the carrier problem information, wherein the carrier problem information indicates whether a carrier failure has occurred on at least one carrier of the multiple carriers; and transmitting, to the first UE, second signaling that indicates the carrier for the data transmission on the SL.

16. The first UE of claim 1, wherein the at least one processor is further operable to cause the first UE to:

determine, after starting the data transmission on the carrier, that no data is being transmitted on the carrier and that additional data is available to be transmitted on the SL;

determine whether at least one of the carrier quality information or the carrier problem information fulfills the carrier selection or reselection condition associated with a set of thresholds; and transmit the additional data on the carrier based at least in part on the carrier fulfilling the carrier selection or reselection condition associated with the set of thresholds.

17. The first UE of claim 1, wherein to determine the carrier, the at least one processor is operable to cause the first UE to select, in the second mode, the carrier.

18. The base station of claim 13, wherein the carrier quality information is based at least in part on a sidelink measurement report from the second UE or pathloss related information maintained by the first UE.

19. The base station of claim 13, wherein the at least one processor is further operable to cause the base station to transmit, to the first UE, third signaling that configures the carrier quality information.

20. The base station of claim 13, wherein the carrier quality information is based at least in part on at least one of:

a measurement result that indicates an SL reference signal received power (SL-RSRP) of the carrier;

a sub-carrier spacing (SCS) parameter for the carrier; or pathloss information associated with the carrier.

* * * * *